United States Patent
Matoda et al.

(10) Patent No.: US 9,637,651 B2
(45) Date of Patent: May 2, 2017

(54) BISMUTH OXIDE-BASED ADDICTIVE FOR LASER MARKING

(71) Applicant: TOKAN MATERIAL TECHNOLOGY CO., LTD., Osaka-shi (JP)

(72) Inventors: Tatsuo Matoda, Osaka (JP); Shigeru Suzuki, Osaka (JP); Taketo Shinchi, Osaka (JP); Akira Ishiko, Osaka (JP)

(73) Assignee: TOKAN MATERIAL TECHNOLOGY CO., LTD., Osaka-Shi (JP)

( * ) Notice: Subject to any disclaimer, the term of this patent is extended or adjusted under 35 U.S.C. 154(b) by 0 days.

(21) Appl. No.: 14/892,577

(22) PCT Filed: Apr. 17, 2014

(86) PCT No.: PCT/JP2014/060897
§ 371 (c)(1),
(2) Date: Nov. 20, 2015

(87) PCT Pub. No.: WO2014/188828
PCT Pub. Date: Nov. 27, 2014

(65) Prior Publication Data
US 2016/0168399 A1    Jun. 16, 2016

(30) Foreign Application Priority Data

May 20, 2013  (JP) ................. 2013-106232

(51) Int. Cl.
| | | |
|---|---|---|
| B32B 3/02 | (2006.01) | |
| C09D 11/037 | (2014.01) | |
| B23K 26/18 | (2006.01) | |
| C01G 29/00 | (2006.01) | |
| C09C 1/00 | (2006.01) | |
| B23K 26/00 | (2014.01) | |
| B23K 26/402 | (2014.01) | |

(52) U.S. Cl.
CPC ........ *C09D 11/037* (2013.01); *B23K 26/0087* (2013.01); *B23K 26/18* (2013.01); *B23K 26/402* (2013.01); *C01G 29/00* (2013.01); *C09C 1/00* (2013.01); *C01P 2002/84* (2013.01); *C01P 2002/85* (2013.01); *C01P 2006/60* (2013.01)

(58) Field of Classification Search
CPC .. C09D 11/037; B23K 26/0087; B23K 26/18; B23K 26/402; C01G 29/00; C09C 1/00
See application file for complete search history.

(56) References Cited

U.S. PATENT DOCUMENTS

| | | | |
|---|---|---|---|
| 5,053,440 A | 10/1991 | Schueler et al. | |
| 6,214,917 B1 | 4/2001 | Linzmeier et al. | |
| 6,503,310 B1 | 1/2003 | Sullivan | |
| 6,503,316 B1* | 1/2003 | Sakoske ................ | B41M 5/262 |
| | | | 106/418 |
| 2005/0137305 A1 | 6/2005 | Carroll et al. | |
| 2007/0029294 A1 | 2/2007 | Peng | |
| 2007/0295689 A1 | 12/2007 | Clauss et al. | |
| 2012/0010345 A1 | 1/2012 | Edler et al. | |
| 2012/0298933 A1 | 11/2012 | Gelissen et al. | |

FOREIGN PATENT DOCUMENTS

| | | |
|---|---|---|
| JP | 2947878 B2 | 2/1991 |
| JP | 2873249 B2 | 7/1992 |
| JP | 10-500149 | 1/1998 |
| JP | 4582387 B2 | 3/2005 |
| JP | 2007-512215 | 5/2007 |
| JP | 2009-83152 | 4/2009 |
| JP | 5028213 B2 | 5/2009 |
| JP | 2010-89997 | 4/2010 |
| JP | 2010-95396 | 4/2010 |
| JP | 2012-131885 | 7/2012 |
| JP | 2013/509459 | 3/2013 |
| WO | 2006/065611 | 6/2006 |
| WO | 2010/105735 | 9/2010 |

OTHER PUBLICATIONS

International Search Report for corresponding International Application No. PCT/JP2014/060897, Jul. 8, 2014.
Wu et al., "The roles of density-tunable surface oxygen vacancy over bouquet-like $Bi_2O_3$ in enhancing photocatalytic activity", Phosical Chemistry Chemical Physics, Nov. 27, 2013, pp. 4165-4175, vol. 16, No. 9, XP055330217, See Cite No. 4.
Extended European Search Report for corresponding EP Application No. 14801793.2-1302, Jan. 5, 2017.

* cited by examiner

*Primary Examiner* — Elizabeth Mulvaney
(74) *Attorney, Agent, or Firm* — Mori & Ward, LLP

(57) ABSTRACT

The present invention is directed to a bismuth oxide-based additive for laser marking containing oxygen-deficient bismuth oxide represented by the general formula: $Bi_2O_{(3-x)}$ (provided that x is 0.01 or more and 0.3 or less and x represents the amount of oxygen deficiency calculated according to the formula: $x=3-O_{1s}/Bi_{4f} \times 2$ from the ratio ($O_{1s}/Bi_{4f}$) of the peak area attributed to the 1s electrons of oxygen bonded to bismuth to the peak area attributed to the 4f electrons of bismuth obtained by X-ray photoelectron spectrometry), which enables marking with excellent blackness and contrast without causing undesirable coloration of a resin composition regardless of the type or shape of a resin to be used.

21 Claims, No Drawings

BISMUTH OXIDE-BASED ADDICTIVE FOR LASER MARKING

TECHNICAL FIELD

The present invention relates to a bismuth oxide-based additive for laser marking for enabling marking by laser irradiation and a method for producing the additive, and relates to a molded material, a coating material, and an ink capable of laser marking containing the additive, and further relates to a coating layer formed on a base material with the coating material, an ink film layer formed on a base material with the ink, a printed material formed on a base material with the ink, or a multi-layered body composed of the ink film layer and a surface protective layer, and still further relates to a laser marking product obtained by irradiating the coating layer, the ink film layer, the printed material, or the multi-layered body with a laser.

BACKGROUND ART

Laser marking is a marking method for printing a letter, a number, a trademark, a bar code, or the like, or forming an image directly on a base material utilizing a laser light.

A marking system utilizing a laser light has the following major characteristics:

(1) it is a non-contact marking method, and therefore, marking can be performed at a high speed on a base material with an arbitrary shape; and (2) an ink is not used, and therefore, marking has excellent abrasion resistance and alteration is difficult, and also volatilization of an organic solvent or the like does not occur, and therefore, the environmental impact is low.

Due to this, at present, marking is transferred from a conventional ink system to a laser marking system in many industries.

In laser marking, a $CO_2$ laser, a YAG laser, a $YVO_4$ laser, a green laser, or the like is used, however, in order to enable fine printing, mainly a YAG laser is preferably used.

However, most major resin molded materials poorly absorb a laser light (typically, a near-infrared light at a wavelength of 1064 nm from YAG). Due to this, it is often difficult to obtain marking with sufficient quality in terms of visibility and definition, and there are not a few resins on which printing cannot be performed at all. This is a large restriction on application of laser marking.

As a known technique for improving the visibility of laser marking on a resin molded material, a technique in which various additives which absorb a laser light are blended in the material is known.

For example, PTL 1 discloses that particles of mixed oxides of tin and antimony having a particle diameter of 10 to 70 nm are added to a molded material (base material) as an additive for laser marking.

The principle of marking is that when the above-mentioned particles in a resin molded material absorb a YAG laser light, the light is converted to heat, and a portion surrounding the additive is carbonized to form a contrast with a portion which is not irradiated with the laser.

PTL 2 describes that laser marking can be performed on a thermoplastic plastic containing a pigment obtained by covering a flaky substrate such as a mica flake or an $SiO_2$ flake with tin dioxide doped with antimony, arsenic, bismuth, copper, gallium, germanium, or an oxide thereof.

However, the methods of these literatures are configured such that the additive acts by absorbing a laser light to convert the light to heat and carbonize the peripheral resin. Therefore, the quality of marking largely depends on the ease of carbonization of a resin or the shape of a resin composition which is a marking target. That is, in the case where a base material resin is hardly carbonized, marking with favorable visibility cannot be obtained, and also in the case where marking is performed on a resin molded material in the shape of a thin film such as a coating material or a film, the thickness of the resin to be carbonized is insufficient, and therefore, a laser light penetrates through a portion to be irradiated due to heat or in the case where printing is performed at a low laser output so as not to cause penetration of the light therethrough, the blackness is insufficient and a problem occurs such that marking with favorable visibility cannot be obtained.

PTL 3 describes that laser marking can be performed with a polymeric substance to which copper hydroxide monophosphate or molybdenum oxide is added, and describes that marking is performed by converting the additive to a colored product by a laser light. In the case where the additive itself is converted to a colored product by a laser light in this manner, the above-mentioned problems may be able to be avoided. However, fine printing cannot be performed, and also the blackness of the print is not a satisfactory level.

PTL 4 and PTL 5 describe that a resin composition and an ink containing bismuth oxide enable black marking by irradiation with a laser light.

However, in the case where laser marking is applied to a resin molded material containing an additive described in these patent literatures, the effect of improving the visibility is observed to some extent, however, the marking property such as blackness and contrast of the marking is still not satisfactory.

On the other hand, as described PTL 6, the present inventors found that a complex oxide composed of copper and molybdenum is discolored to have a color tone with high blackness by irradiation with a laser light. This complex oxide well absorbs a laser light and at the same time, the particles themselves are discolored from light yellow to black, and therefore, a resin molded material containing this oxide as an additive enables laser marking excellent in both blackness of marking and printing definition. However, the complex oxide has an undesirable problem that the oxide itself is yellow, and therefore, the resin molded material itself is slightly colored.

The present inventors further found in PTL 7 that a complex hydroxide composed of copper and molybdenum is discolored to have a color tone with higher blackness and printing definition by irradiation with a laser light, and also has a low resin coloration property. The complex hydroxide has excellent printing definition, however, particularly, in the case where laser marking is applied to an ink film with a small film thickness of 5 μm or less, an undesirable problem arises such that the marking property such as blackness and contrast of the marking is poor.

CITATION LIST

Patent Literature

PTL 1: JP-T-2007-512215
PTL 2: JP-T-10-500149
PTL 3: Japanese Patent No. 2947878
PTL 4: Japanese Patent No. 2873249
PTL 5: JP-A-2012-131885
PTL 6: Japanese Patent No. 4582387
PTL 7: Japanese Patent No. 5028213

SUMMARY OF INVENTION

Problems to be Solved

In light of the above problems, an object of the present invention is to provide a bismuth oxide-based additive for laser marking for enabling marking with excellent blackness and contrast without causing undesirable coloration of a molded material, a coating material, or an ink containing the additive for laser marking, a coating layer formed on a base material with the coating material, an ink film layer formed on a base material with the ink, a printed material formed on a base material with the ink, or a multi-layered body composed of the ink film layer and a surface protective layer.

Another object of the present invention is to provide a method for producing a bismuth oxide-based additive for laser marking having excellent properties as described above.

Still another object of the present invention is to provide a molded material, a coating material, an ink, a coating layer, an ink film layer, a printed material, or a multi-layered body containing a bismuth oxide-based additive for laser marking having excellent properties as described above.

The present inventors made intensive studies in order to achieve these objects, and as a result, they found that a special bismuth oxide-based oxide described in detail below has surprisingly excellent qualifications as an additive for laser marking, that is, enables marking with excellent definition and very high blackness without causing undesirable coloration even if the additive is added to a resin composition in a necessary amount independent of the type or shape of a substrate resin, and thus completed the present invention.

Means for Solving the Problems

The additive for laser marking according to the present invention is characterized by containing bismuth oxide with oxygen deficiency.

The bismuth oxide is preferably oxygen-deficient bismuth oxide represented by the following general formula.

$$Bi_2O_{(3-x)}$$

(provided that $0.01 \leq x \leq 0.3$.)

In the above formula, x represents the amount of oxygen deficiency and is 0.01 or more and 0.3 or less, preferably 0.01 or more and 0.2 or less, more preferably 0.01 or more and 0.1 or less. Further, x may be 0.02 or more and 0.2 or less, preferably 0.03 or more and 0.1 or less, more preferably 0.04 or more and 0.1 or less.

The amount of oxygen deficiency x in the above formula is calculated according to the following formula (1) wherein the ratio of the peak area attributed to the 1s electrons of oxygen bonded to bismuth to the peak area attributed to the 4f electrons of bismuth obtained by X-ray photoelectron spectrometry is represented by $O_{1s}/Bi_{4f}$.

$$x = 3 - O_{1s}/Bi_{4f} \times 2 \quad (1)$$

That is, in the case where the range of $O_{1s}/Bi_{4f}$ in the above formula (1) is as follows: $1.35 \leq O_{1s}/Bi_{4f} \leq 1.495$, the range of the amount of oxygen deficiency x is as follows: $0.01 \leq x \leq 0.3$, and in the case where the range of $O_{1s}/Bi_{4f}$ is as follows: $1.45 \leq O_{1s}/Bi_{4f} \leq 1.495$, the range of the amount of oxygen deficiency x is as follows: $0.01 \leq x \leq 0.1$.

The additive for laser marking according to the present invention has an absorptivity at a wavelength of 1064 nm calculated according to the following formula (2) from a diffuse reflectance in the ultraviolet-visible-near-infrared reflectance spectra of 20 to 80%.

$$\text{absorptivity} = 100 - \text{diffuse reflectance (\%)} \quad (2).$$

The additive for laser marking according to the present invention has an absorptivity at a wavelength of 532 nm calculated according to the above formula (2) from a diffuse reflectance in the ultraviolet-visible-near-infrared reflectance spectra of 20 to 80%.

The additive for laser marking according to the present invention can be more preferably produced by a method including a step of mixing bismuth oxide or a bismuth compound which is converted to an oxide by application of heat and metallic aluminum at a ratio of the latter to the former of 0.001 to 20% by weight by a dry process or a wet process, and a step of heating the resulting mixture at 60 to 400° C. under reduced pressure lower than the atmospheric pressure by 0.05 MPa or more.

The present invention further provides a molded material, a coating material, and an ink capable of laser marking containing the additive for laser marking, and further provides a coating layer formed on a base material with the coating material, an ink film layer formed on a base material with the ink, a printed material formed on a base material with the ink, or a multi-layered body composed of the ink film layer and a surface protective layer, and further provides a laser marking product obtained by irradiating the coating layer, the ink film layer, the printed material, or the multi-layered body with a laser.

The laser light to be used for laser marking may be a $CO_2$ laser, a YAG laser, a $YVO_4$ laser, or a green laser, and may have a wavelength of 532 to 10600 nm. Particularly, the laser light is preferably a YAG laser with a center wavelength of 1064 nm or a green laser with a center wavelength of 532 nm.

Hereinafter, the present invention will be described in further detail.

In oxygen-deficient bismuth oxide represented by the general formula: $Bi_2O_{(3-x)}$ (provided that $0.01 \leq x \leq 0.3$), if the amount of oxygen deficiency x in the formula is less than 0.01, the black color developability of the additive itself by irradiation with a laser light is poor, and the marking property is not favorable. Further, if the amount of oxygen deficiency x in the formula is more than 0.3, the obtained powder has dark gray color so as to color the base material, and therefore, the visibility of marking becomes poor, and therefore, the material cannot be used practically as the additive.

The additive for laser marking according to the present invention enables marking with higher definition as the particle diameter of the additive is smaller. The average particle diameter D50 of the additive is preferably 10 μm or less, more preferably 1 μm or less.

The additive for laser marking according to the present invention has an absorptivity at a wavelength of 1064 nm calculated from a diffuse reflectance in the ultraviolet-visible-near-infrared reflectance spectra of 20 to 80%, preferably 30 to 70%, more preferably 40 to 60%.

As the amount of oxygen deficiency in the bismuth oxide is larger, the absorptivity at 1064 nm which is the center wavelength of a YAG laser is increased, and the marking property is improved. If the absorptivity is less than 20%, the blackness of marking is insufficient, and if the absorptivity exceeds 80%, the base material is discolored dark gray to black, and therefore, both cases are not preferred from a practical point of view.

The additive for laser marking according to the present invention has an absorptivity at a wavelength of 532 nm calculated from a diffuse reflectance in the ultraviolet-visible-near-infrared reflectance spectra of 20 to 80%, preferably 30 to 80%, more preferably 40 to 70%.

As the amount of oxygen deficiency in the bismuth oxide is larger, the absorptivity at 532 nm which is the center wavelength of a green laser is increased, and the marking property is improved. If the absorptivity is less than 20%, the blackness of marking is insufficient, and if the absorptivity exceeds 80%, the base material is discolored dark gray to black, and therefore, both cases are not preferred from a practical point of view.

Further, among the additives for laser marking having been reported so far, there are additives having a high absorptivity at a wavelength of 1064 nm or 532 nm in the ultraviolet-visible absorption spectra. Examples thereof include particles of mixed oxides of tin and antimony described in PTL 1 and antimony trioxide, however, these materials do not exhibit a favorable marking property.

This is because the particles of mixed oxides of tin and antimony, antimony trioxide, and the like have an ability to absorb a laser light and carbonize a resin component around the additive, however, the black color developability of the additive itself when it is irradiated with a laser is extremely poor, resulting in poor marking property such as the printing blackness in many cases.

On the other hand, as described above with respect to PTL 4 or PTL 5, it is described that bismuth oxide, that is, $Bi_2O_3$ itself can be used as an additive for laser marking, however, it is difficult to say that the printing performance is sufficiently high as shown in Comparative Example.

The feature of the present invention resides in that a predetermined amount of oxygen deficiency is introduced into bismuth trioxide, and thereby the black color developability of the additive itself by irradiation with a laser light is dramatically enhanced. As a result, by including oxygen deficiency in the structure of bismuth oxide, the additive according to the present invention greatly improves the black color developability of the additive itself when it is irradiated with a laser, and therefore, an excellent laser marking property is exhibited.

Further, examination of bismuth oxide as a photocatalyst has also been performed, and in a relevant technical field, it is regarded that there is a case where the sensitivity of a photocatalyst to an ultraviolet light or a visible light is enhanced by introducing oxygen deficiency or an impurity into the photocatalyst (JP-A-2005-156588, JP-A-2006-150155).

However, the photocatalyst generates an OH radical by a photoelectron effect and makes this OH radical effectively act to decompose an organic material, and the photocatalyst itself does not chemically change at all by the light. Therefore, the present invention in which bismuth oxide itself develops black color by a laser light cannot be easily arrived at from the conventional technique relating to a photocatalyst.

In this manner, the present inventors succeeded in significantly improving the black color developability of the additive itself with a laser light by further introducing oxygen deficiency into the structure of bismuth oxide which is an additive for laser marking and originally has an ability to absorb a laser light, and as a result, they revealed that the additive according to the present invention can impart an excellent laser marking property to a resin composition in various forms, for example, a molded body, a coating material, an ink, etc.

Next, a method for producing the additive for laser marking according to the present invention will be described.

A preferred method for producing this additive includes a step of blending bismuth oxide or a bismuth compound which is converted to an oxide by application of heat and a reducing agent at a predetermined ratio and mixing the resulting blended material by a dry process or a wet process, and a step of heating the resulting mixture at 60 to 400° C. under reduced pressure lower than the atmospheric pressure by 0.05 MPa or more.

Here, the "predetermined ratio" is a ratio when mixing a starting material bismuth compound and a reducing agent necessary for obtaining oxygen-deficient bismuth oxide represented by the general formula: $Bi_2O_{(3-x)}$ (provided that $0.01 \leq x \leq 0.3$), and a preferred ratio of the reducing agent to the starting material bismuth compound is from 0.001 to 20% by weight, more preferably from 0.01 to 10% by weight, further more preferably from 0.1 to 5% by weight.

Examples of the bismuth compound which is converted to an oxide by application of heat include bismuth oxychloride, bismuth nitrate, and bismuth hydroxide. The bismuth compound is preferably bismuth oxide, bismuth hydroxide, or the like which does not generate a hazardous gas in the latter heating step.

As the reducing agent, any known reducing agent can be used, however, a reducing agent having high reducing power is preferred, and for example, sodium borohydride or metallic aluminum is preferably used.

In the mixing by a dry process, a general-purpose mixing machine may be used, and for example, a Henschel mixer, a Super mixer, a Ribocone, a Nauta mixer, a Turbulizer, a Cyclomix, a Spiralpin mixer, a Lodige mixer, or the like is preferably used.

A solvent to be used in the mixing by a wet process is not particularly limited, however, in the case where the above-mentioned sodium borohydride or metallic aluminum is used as the reducing agent, it is desired to use water as the solvent. It is because hydrogen is generated during mixing, and the reduction reaction can be further accelerated.

Subsequently, the resulting mixture or a slurry containing the mixture is heated at 60° C. or higher, generally at 60 to 400° C. under reduced pressure lower than the atmospheric pressure by 0.05 MPa or more, preferably by 0.06 MPa to 0.1 MPa.

By the former mixing step, bismuth oxide is reduced and oxygen deficiency is introduced, and by the latter heating step, oxygen deficiency is further introduced under a reduced pressure condition without oxidizing oxygen deficiency.

The heating condition is, for example, 60° C. for 24 hours or more, preferably in the range of 70° C. to 180° C. for 24 hours or more, more preferably in the range of 190° C. to 400° C. for 24 hours or more. By heating a material in which sufficient oxygen deficiency is not introduced into bismuth oxide in the former mixing step at about 60 to 300° C. under the above-mentioned reduced pressure, the reduction of the bismuth oxide is made to further proceed, and sufficient oxygen deficiency can be introduced.

If the drying temperature is higher than 400° C., the amount of introduced oxygen deficiency is increased excessively, and the color of a powder becomes dark gray to black, and therefore also the color of the base material is changed to such a color, and further, the visibility of the marking is also not favorable.

The additive for laser marking according to the present invention may be subjected to, for example, a surface treatment using a known surface treatment material such as a silane-coupling material, a fatty acid, a silicone, or a polyol for facilitating the dispersion of the additive in a resin or the like.

Next, a molded material capable of laser marking containing the additive for laser marking according to the present invention will be described.

A representative example of a material for forming the molded material is a synthetic resin, however, the material may be a glass or a ceramic which does not require such a high processing temperature that deterioration of the material occurs.

The type of the synthetic resin is not particularly limited and may be a thermoplastic resin or a thermosetting resin.

Examples of the thermoplastic resin include polyolefin, polyvinyl chloride, polyvinylidene chloride, polystyrene, polyvinyl acetate, polytetrafluoroethylene, acrylonitrile butadiene styrene, polyacrylmethacrylate, polyamide, polyacetal, polycarbonate, polybutylene terephthalate, polyethylene terephthalate, polyphenylene sulfide, polysulfone, polyimide, a mixture of any of these, and a copolymer using any of these as a base.

Examples of the thermosetting resin include a phenolic resin, an epoxy resin, a melamine resin, a urea resin, an unsaturated polyester resin, an alkyd resin, polyurethane, a thermosetting polyimide, and a mixture of any of these.

The molding material may be a polymer with a silicon skeleton such as a silicone.

The shape and size of the molded material may be arbitrary. Examples thereof include a member such as a plate, a rod, a film, or a thin film, a container, a packaging product, an electronic component, a card, and a coating material.

The most suitable amount of the additive in the molded material for laser marking varies depending on the type of the molding material or the shape of the molded material. Therefore, the most suitable addition amount is determined every time according to the condition of use, however, sufficient laser marking performance can be obtained when the addition amount of the additive is about 0.01% by weight at a minimum. In the case where the blackness of marking is desired to be further improved, or in the case where the shape of the molded material is a film or a thin film, in order to impart high laser marking performance to the molded material, the addition amount of the additive for laser marking of the invention is increased so that the necessary laser marking performance is ensured. As a guide, the addition amount is up to about 30% by weight at a maximum, and may be further increased within the range which does not affect the other physical properties such as moldability. The ratio of the additive in the molded material for laser marking is preferably from 1 to 25% by weight, more preferably from 5 to 30% by weight.

The additive for laser marking according to the present invention can be added to the molding material in the form of a combination with an inorganic or organic pigment and a dye for the purpose of coloring the molded material.

Examples of the inorganic pigment include white pigments such as titanium oxide, zinc oxide, antimony oxide, and zinc sulfide; extender pigments such as magnesium oxide and calcium oxide; iron oxide, ultramarine, Prussian blue, carbon black; coloring pigments such as complex oxide pigments including titanium yellow, cobalt blue, etc.; and high luster pigments such as a mica pigment covered with bismuth oxychloride, titanium oxide or the like.

Examples of the organic pigment include azo, azomethine, methine, anthraquinone, phthalocyanine, perylene, thioindigo, quinacridone, and quinophthalone pigments.

Examples of the dye include anthraquinone-based, azo dye metal complexes, and further include fluorescent dyes such as coumarin, naphthalimide, xanthene, and thiazine.

Further, an additive which is generally used for processing a resin such as a light stabilizer, an antioxidant, a flame retardant, or glass fibers may be used in combination depending on the application. In addition, it is also possible to use a known additive such as an ultraviolet absorber, an antistatic agent, or an additive for electromagnetic wave shielding in combination.

Next, the coating material capable of laser marking containing the additive for laser marking according to the present invention will be described.

The coating material may be either an aqueous coating material or a solvent-based coating material, and as a resin constituting the coating material may be a synthetic resin such as an alkyd resin, an acrylic resin, an amino resin, a polyurethane resin, an epoxy resin, a silicone resin, a fluorine resin, an acrylic silicone resin, an unsaturated polyester resin, a UV-curable resin, a phenolic resin, or a vinyl chloride resin. A coating material containing a natural resin such as rosin, shellac, ester gum, tar pitch, or lacquer as a main component can also be used.

The ratio of the additive in the coating material for laser marking is from 0.1 to 90% by weight, preferably from 1 to 60% by weight, more preferably from 5 to 50% by weight.

The additive for laser marking according to the present invention can be added to the molding material in the form of a combination with an inorganic or organic pigment and a dye for the purpose of coloring the coating material.

Examples of the inorganic pigment include white pigments such as titanium oxide, zinc oxide, antimony oxide, and zinc sulfide; extender pigments such as magnesium oxide and calcium oxide; iron oxide, ultramarine, Prussian blue, carbon black; coloring pigments such as complex oxide pigments including titanium yellow, cobalt blue, etc.; and high luster pigments such as a mica pigment covered with bismuth oxychloride, titanium oxide or the like.

Examples of the organic pigment include azo, azomethine, methine, anthraquinone, phthalocyanine, perylene, thioindigo, quinacridone, and quinophthalone pigments.

Examples of the dye include anthraquinone-based, azo dye metal complexes, and further include fluorescent dyes such as coumarin, naphthalimide, xanthene, and thiazine.

Further, an additive which is generally used for a coating material such as a solvent, a dispersant, a filler, an aggregate, a thickening agent, a flow control agent, a leveling agent, a curing agent, a crosslinking agent, or an ultraviolet absorber can also be used in combination depending on the application.

Next, the ink capable of laser marking containing the additive for laser marking according to the present invention will be described.

The ink for laser marking according to the present invention is characterized by containing the additive for laser marking containing bismuth oxide with oxygen deficiency in an amount of 0.1 to 90% by weight. This ink is discolored to have a color tone with high blackness by irradiation with a laser. If the content of the additive for laser marking in the ink is too low, a color tone with high blackness by irradiation with a laser cannot be obtained, and if the content thereof is too high, the durability of a formed ink film layer is deteriorated, and therefore, both cases are not preferred.

The ratio of the additive in the ink for laser marking is from 0.1 to 90% by weight, preferably from 1 to 60% by weight, more preferably from 5 to 50% by weight.

The ink for laser marking according to the present invention may be an ink obtained by coating a substrate selected from a mica flake, a mica flake covered with a metal oxide, an $SiO_2$ flake, and a glass filler with the additive for laser marking or an ink obtained by mixing the substrate with the additive.

The ink for laser marking according to the present invention may contain at least one material selected from the group consisting of an inorganic or organic pigment, a dye, a resin, an organic solvent, a reactive monomeric compound, and a stabilizer. The amount of the pigment, dye, resin, organic solvent, reactive monomeric compound, and/or stabilizer in the ink for laser marking is preferably from 1 to 30% by weight.

Examples of the inorganic pigment include white pigments such as titanium oxide, zinc oxide, antimony oxide, and zinc sulfide; extender pigments such as magnesium oxide and calcium oxide; iron oxide, ultramarine, Prussian blue, carbon black; coloring pigments such as complex oxide pigments including titanium yellow, cobalt blue, etc.; and high luster pigments such as a mica pigment covered with bismuth oxychloride, titanium oxide or the like.

Examples of the organic pigment include azo, azomethine, methine, anthraquinone, phthalocyanine, perylene, thioindigo, quinacridone, and quinophthalone pigments.

Examples of the dye include anthraquinone-based, azo dye metal complexes, and further include fluorescent dyes such as coumarin, naphthalimide, xanthene, and thiazine.

As the resin to be contained in the ink for laser marking according to the present invention, a thermoplastic resin such as a urethane-based resin, an acrylic resin, a polyacetal resin, a polyamide resin, a polyimide resin, a polyester resin, a polyvinyl chloride resin, a polyolefin resin, a polycarbonate resin, a polystyrene resin, or a polysulfone resin; a thermosetting resin such as an epoxy resin, a diallyl phthalate resin, a silicone resin, a phenolic resin, an unsaturated polyester resin, a melamine resin, or a urea resin; a copolymer thereof, or the like may be used. The resin is preferably a urethane-based resin or an acrylic resin from the viewpoint that the adhesiveness to a base material is favorable.

The ink for laser marking according to the present invention is generally in the form of being dissolved in an organic solvent.

As the organic solvent, a known solvent for use in inks can be used, and examples thereof include methyl ethyl ketone, methyl isobutyl ketone, 1-methoxy-2-propanol, toluene, xylene, cyclohexane, methyl acetate, ethyl acetate, isopropyl acetate, n-propyl acetate, n-butyl acetate, isobutyl acetate, methanol, ethanol, n-propyl alcohol, isopropyl alcohol, n-butyl alcohol, isobutyl alcohol, secondary butyl alcohol, acetone, methyl ethyl ketone, propylene glycol monomethyl ether, propylene glycol monomethyl ether acetate, propylene glycol monoethyl ether propylene glycol monoethyl ether acetate, ethylene glycol monomethyl ether, ethylene glycol monomethyl ether acetate, ethylene glycol monoethyl ether, and ethylene glycol monoethyl ether acetate.

Examples of the reactive monomeric compound include N-vinylpyrrolidone, dipropylene glycol diacrylate, tripropylene glycol diacrylate, butanediol diacrylate, hexanediol diacrylate, trimethylolpropane triacrylate, ethoxylated trimethylolpropane triacrylate, glycerol propoxy triacrylate, pentaerythritol triacrylate, dipropylene glycol dimethacrylate, tripropylene glycol dimethacrylate, butanediol dimethacrylate, hexanediol dimethacrylate, trimethylolpropane trimethacrylate, di(3-methacryloxy-2-hydroxypropyl ether) of bisphenol A, di(2-methacryloxyethyl ether) of bisphenol A, di(3-acryloxy-2-hydroxypropyl ether) of bisphenol A, and di(2-acryloxyethyl ether) of bisphenol A.

The stabilizer is used for preventing decomposition or discoloration of a pigment or a resin, and examples thereof include an ultraviolet absorber and an antioxidant such as benzophenone-based, benzotriazole-based, cyanoacrylate-based, benzoate-based, formamidine-based, and hindered amine-based compounds, aminobenzoic acid, and aminobenzoic acid esters.

By adding the above-mentioned organic solvent, reactive monomeric compound, stabilizer, or the like, the ink for laser marking according to the present invention can be used as a base coating liquid for an ink for flood coating, a flexo/gravure ink, a UV-curable offset printing ink, a conventional offset printing ink, or the like.

For the dispersion of the additive for laser marking in the ink, a sand mill, a bead mill, an attritor, or the like can be used. The dispersion may be performed after all the components are mixed, however, a pigment may be dispersed in advance by using a known dispersing machine such as a dissolver, a homomixer, a ball mill, a roll mill, a millstone type mill, or an ultrasonic dispersing machine.

Further, a surface treatment may be performed for enhancing the dispersibility of the additive for laser marking.

When the additive for laser marking is dispersed in the ink, a dispersant, a surface treatment agent, a sensitizing agent for improving the laser characteristics, or the like may be added. In addition, a known additive such as a light stabilizer, a flame retardant, glass fibers, an antistatic agent, or an additive for electromagnetic wave shielding may be used in combination depending on the application.

The present invention provides an ink film layer for laser marking obtained by coating at least one surface of a base material with the above-mentioned ink for laser marking, a printed material for laser marking obtained by performing printing on at least one surface of a base material with the above-mentioned ink for laser marking, and a multi-layered body for laser marking composed of an ink film layer formed with the above-mentioned ink for laser marking provided on a base material and a transparent surface protective layer provided on the ink film layer.

Next, the multi-layered body for laser marking will be described.

The base material of the multi-layered body for laser marking may be a base material composed of a plastic film, a paper, a metal foil, a glass, a ceramic, a wood material, or the like. The type of a synthetic resin constituting the plastic film is not particularly limited and may be a thermoplastic resin, a thermosetting resin, or a UV/EB-curable resin. Examples of the thermoplastic resin include polyolefin, polyvinyl chloride, polyvinylidene chloride, polystyrene, polyvinyl acetate, polytetrafluoroethylene, acrylonitrile butadiene styrene, polyacrylmethacrylate, polyamide, nylon, polyacetal, polycarbonate, polybutylene terephthalate, polyethylene terephthalate, polyphenylene sulfide, polysulfone, polyimide, polyamide, a mixture of any of these, and a copolymer using any of these as a base. Examples of the thermosetting resin include a phenolic resin, an epoxy resin, a melamine resin, a urea resin, an unsaturated polyester resin, an alkyd resin, polyurethane, a thermosetting polyimide, and a mixture of any of these. The thickness of the plastic film is not particularly limited, but is preferably from 12 to 40 µm in the case of PET and from 20 to 50 µm in the case of OPP.

As the paper, an art paper, a coated paper, a high-quality paper, a Japanese paper, a synthetic paper, or the like can be used. As the aluminum foil, an aluminum foil having a thickness suitable for printing, for example, a thickness of 5 to 150 µm can be used.

The shape and size of the base material may be arbitrary. Examples thereof include a member, a container, a packaging product, an electronic component, a card, and a coating composition.

The thickness of the transparent surface protective layer constituting the multi-layered body for laser marking is not particularly limited, but is preferably 1 µm or more, particularly preferably 10 µm or more.

The surface protective layer is usually formed by a method in which a coating liquid which becomes the surface protective layer is applied onto the ink film layer composed of the ink for laser marking, followed by drying, but can also be formed by a method in which a coating liquid which becomes the surface protective layer is applied onto the ink film layer, followed by drying, and then further curing by irradiation with an ultraviolet light or the like, a method in which a film which becomes the surface protective layer is bonded directly or through an adhesive layer onto the ink film layer, or the like.

In the case where the surface protective layer is formed from a coating liquid, examples of a binder resin in the coating liquid include water-soluble materials such as cellulose, methyl cellulose, methoxy cellulose, hydroxyethyl cellulose, carboxymethyl cellulose, polyvinyl alcohol, polyacrylamide, polyacrylic acid, casein, gelatin, a styrene/maleic anhydride copolymer salt, an isobutylene/maleic anhydride copolymer salt, a polyacrylic acid ester, a polyurethane resin, and an acrylic/styrene resin. Examples of the solvent type resin include styrene/maleic acid, an acrylic/styrene resin, polystyrene, polyester, polycarbonate, an epoxy resin, a polyurethane resin, a polybutyral resin, a polyacrylic acid ester, a styrene/butadiene copolymer, a styrene/butadiene/acrylic acid copolymer, and polyvinyl acetate. The coating liquid can be used in combination with a curing agent for the purpose of improving the film strength, heat resistance, water resistance, solvent resistance, and the like of the surface protective layer.

In the case where a radiation-curable layer is provided as the surface protective layer, a monomer, a prepolymer, an oligomer, or the like having one or more ethylenically unsaturated bonds is used. Examples of the monomer which can be used in the present invention include monofunctional monomers such as N-vinylpyrrolidone, acrylonitrile, styrene, acrylamide, 2-ethylhexyl acrylate, 2-hydroxy(meth)acrylate, 2-hydroxypropyl (meth)acrylate, tetrahydrofurfuryl acrylate, phenoxyethyl acrylate, nonylphenoxyethyl acrylate, butoxyethyl (meth)acrylate, 2-hydroxy-3-phenoxypropyl acrylate, cyclohexyl (meth)acrylate, N,N-dimethylamino (meth)acrylate, N,N-dimethylaminoethyl(meth)acrylate ethyl, 3-phenoxypropyl acrylate, and 2-methoxyethyl (meth)acrylate; difunctional monomers such as ethylene glycol diacrylate, diethylene glycol diacrylate, polypropylene glycol diacrylate, neopentyl glycol diacrylate, tetraethylene glycol diacrylate, 1,4-butanediol di(meth)acrylate, 1,6-hexanediol di(meth)acrylate, and 1,12-dodecanediol di(meth)acrylate; trifunctional monomers such as trimethylolpropane tri(meth)acrylate, trimethyloloctane tri(meth)acrylate, trimethylolpropane polyethoxy tri(meth)acrylate, and pentaerythritol tri(meth)acrylate; tetrafunctional monomers such as pentaerythritol polypropoxy tetra(meth)acrylate and ditrimethylolpropane tetra(meth)acrylate; and other penta- or higher functional monomers such as dipentaerythritol penta(meth)acrylate and dipentaerythritol hexa(meth)acrylate. In the case where a monomer, a prepolymer, or an oligomer is used as a radiation-curable composition, it is preferred to use a tri- or higher functional monomer, prepolymer, or oligomer in an amount within the range of 20 to 95% by weight. If the amount thereof is 20% by weight or less, the film density and film strength of the surface protective layer are low, and the smoothness of the printed surface may be deteriorated, or the physical properties such as water resistance, oil resistance, and abrasion resistance may also be deteriorated in some cases. If the amount thereof is 95% by weight or more, the surface protective layer becomes too hard, and when the printed material is folded, peeling of the surface protective layer is liable to occur. In the case where curing is performed with an ultraviolet light, a photopolymerization initiator, and according to need, a sensitizer are needed for the radiation-curable composition. As the photopolymerization initiator, an acetophenone-based, benzophenone-based, thioxanthone-based, benzoin-based, benzoin methyl ether-based photopolymerization initiator, or the like can be used, and as the sensitizer, an amine-based compound such as N-methyldiethanolamine, diethanolamine, triethanolamine, or isoamyl p-dimethylaminobenzoate ester, tri-n-butyl phosphine, Michler's ketone, or the like can be used. In the case where curing is performed with an electron beam, it is possible to achieve curing without using the above-mentioned photopolymerization initiator, sensitizer, or the like.

In the case where a film is used as the surface protective layer, the film is directly laminated on the surface protective layer, or a laminated film in which the film and an adhesive layer are laminated in advance is bonded to the ink film layer.

The present invention further provides a laser marking product which is obtained by performing marking by irradiating the molded material containing the additive for laser marking, the coating layer formed on a base material with the coating material, the ink film layer formed on a base material with the ink, the printed material obtained by performing printing on a base material with the ink, and the multi-layered body with a laser.

The laser is preferably a YAG laser with a center wavelength of 1064 nm or a green laser with a center wavelength of 532 nm. The laser irradiation conditions are appropriately selected depending on the printing method, the printing conditions, the type of the base material, etc.

Advantageous Effects of Invention

The additive for laser marking according to the present invention is composed of bismuth oxide with oxygen deficiency, and the color of any of the compounds is white or very light gray, and therefore, as being verified in the below-mentioned Examples, undesirable coloration does not occur in a molded material, a coating material, or an ink containing the additive for laser marking, a coating layer formed on a base material with the coating material, an ink film layer formed on a base material with the ink, a printed material obtained by performing printing on a base material with the ink, or a multi-layered body composed of the ink film layer and a surface protective layer. In addition, by performing laser marking on the molded material, the coating layer, the ink film layer, the printed material, or the multi-layered body, a laser marking product with more excellent blackness and contrast in comparison with a material composed of bismuth oxide with no oxygen deficiency can be obtained.

DESCRIPTION OF EMBODIMENTS

The present invention will be described in more detail with reference to the following Examples. The term "part(s)" in the following description is on a weight basis unless otherwise specified.

Synthesis Examples of Bismuth Oxide with Oxygen Deficiency

Synthesis Example 1

200 g of commercially available bismuth oxide $Bi_2O_3$ and 0.02 g of metallic aluminum were added to 1000 mL of distilled water, and the entire mixture was stirred for 3 hours by a dissolver. After the resulting suspension was filtered, the residue was dried at 60° C. for 48 hours under a reduced pressure of 0.1 MPa, whereby a powder was obtained.

Synthesis Example 2

200 g of commercially available bismuth oxide $Bi_2O_3$ and 0.2 g of metallic aluminum were added to 1000 mL of distilled water and stirred for 3 hours by a dissolver. After the resulting suspension was filtered, the residue was dried at 150° C. for 24 hours under a reduced pressure of 0.1 MPa, whereby a powder was obtained.

Synthesis Example 3

200 g of commercially available bismuth oxide $Bi_2O_3$ and 2.0 g of metallic aluminum were added to 1000 mL of distilled water and stirred for 3 hours by a dissolver. After the resulting suspension was filtered, the residue was dried at 150° C. for 24 hours under a reduced pressure of 0.1 MPa, whereby a powder was obtained.

Synthesis Example 4

200 g of commercially available bismuth oxide $Bi_2O_3$ and 2.0 g of metallic aluminum were added to 1000 mL of distilled water and stirred for 3 hours by a dissolver. After the resulting suspension was filtered, the residue was dried at 200° C. for 24 hours under a reduced pressure of 0.1 MPa, whereby a powder was obtained.

Synthesis Example 5

200 g of commercially available bismuth oxide $Bi_2O_3$ and 2.0 g of metallic aluminum were added to 1000 mL of distilled water and stirred for 3 hours by a dissolver. After the resulting suspension was filtered, the residue was dried at 250° C. for 24 hours under a reduced pressure of 0.1 MPa, whereby a powder was obtained.

Synthesis Example 6

200 g of commercially available bismuth oxide $Bi_2O_3$ and 0.002 g of metallic aluminum were added to 1000 mL of distilled water and stirred for 3 hours by a dissolver. After the resulting suspension was filtered, drying was performed at 120° C. for 24 hours under a reduced pressure of 0.1 MPa, whereby a powder was obtained.

Synthesis Example 7

200 g of commercially available bismuth oxide $Bi_2O_3$ and 1.0 g of metallic aluminum were added to 1000 mL of distilled water and stirred for 3 hours by a dissolver. After the resulting suspension was filtered, drying was performed at 150° C. for 24 hours under a reduced pressure of 0.1 MPa, whereby a powder was obtained.

Synthesis Example 8

200 g of commercially available bismuth oxide $Bi_2O_3$ was added to 1000 mL of distilled water, and 5.0 g of metallic aluminum was slowly added thereto over 5 minutes while stirring the mixture by a dissolver, and the mixture was further stirred for 3 hours. After the resulting suspension was filtered, drying was performed at 150° C. for 24 hours under a reduced pressure of 0.1 MPa, whereby a powder was obtained.

Synthesis Example 9

200 g of commercially available bismuth oxide $Bi_2O_3$ was added to 1000 mL of distilled water, and 10.0 g of metallic aluminum was slowly added thereto over 10 minutes while stirring the mixture by a dissolver, and the mixture was further stirred for 3 hours. After the resulting suspension was filtered, drying was performed at 150° C. for 24 hours under a reduced pressure of 0.1 MPa, whereby a powder was obtained.

Synthesis Example 10

200 g of commercially available bismuth oxide $Bi_2O_3$ was added to 1000 mL of distilled water, and 20.0 g of metallic aluminum was slowly added thereto over 20 minutes while stirring the mixture by a dissolver, and the mixture was further stirred for 3 hours. After the resulting suspension was filtered, drying was performed at 150° C. for 24 hours under a reduced pressure of 0.1 MPa, whereby a powder was obtained.

Synthesis Example 11

200 g of commercially available bismuth oxide $Bi_2O_3$ was added to 1000 mL of distilled water, and 40.0 g of metallic aluminum was slowly added thereto over 30 minutes while stirring the mixture by a dissolver, and the mixture was further stirred for 3 hours. After the resulting suspension was filtered, drying was performed at 150° C. for 24 hours under a reduced pressure of 0.1 MPa, whereby a powder was obtained.

Comparative Synthesis Example 1

200 g of commercially available bismuth oxide $Bi_2O_3$ and 0.01 g of metallic aluminum were added to 1000 mL of distilled water and stirred for 3 hours by a dissolver. After the resulting suspension was filtered, the residue was dried at 60° C. for 48 hours under a reduced pressure of 0.04 MPa, whereby a bismuth oxide powder was obtained.

Comparative Synthesis Example 2

200 g of commercially available bismuth oxide $Bi_2O_3$ and 0.02 g of metallic aluminum were added to 1000 mL of distilled water and stirred for 3 hours by a dissolver. After the resulting suspension was filtered, the residue was dried at 60° C. for 24 hours under a reduced pressure of 0.04 MPa, whereby a bismuth oxide powder was obtained.

Comparative Synthesis Example 3

200 g of commercially available bismuth oxide $Bi_2O_3$ was added to 1000 mL of distilled water, and 10.0 g of metallic aluminum was slowly added thereto over 10 minutes while stirring the mixture by a dissolver, and the mixture was further stirred for 3 hours. After the resulting suspension was filtered, drying was performed at 280° C. for 72 hours under a reduced pressure of 0.1 MPa, whereby a powder was obtained.

Comparative Synthesis Example 4

A commercially available bismuth oxide $Bi_2O_3$ powder (average particle diameter: 3 μm) was prepared.

Comparative Synthesis Example 5

A commercially available antimony trioxide powder was prepared.

Comparative Synthesis Example 6

A commercially available tin dioxide powder (primary particle diameter: 20 nm) doped with antimony was prepared.

The ratio (% by weight) of metallic aluminum to commercially available bismuth oxide used as the starting material in Synthesis Examples 1 to 11 and Comparative Synthesis Examples 1 to 3 is shown in Table 1.

Analytical Test for Bismuth Oxide

With respect to each of the powders obtained in Synthesis Examples 1 to 11 and Comparative Synthesis Examples 1 to 6, an absorptivity α1 at a wavelength of 1064 nm and an absorptivity α2 at a wavelength of 532 nm in the ultraviolet-visible-near-infrared reflectance spectra, and $O_{1s}/Bi_{4f}$ on the basis of X-ray photoelectron spectrometry and the amount of oxygen deficiency x were determined according to the following methods. The obtained values are shown in Table 1.

In the measurement of the ultraviolet-visible-near-infrared reflectance spectra, a diffuse reflectance was measured using an integrating sphere unit in an ultraviolet-visible-near-infrared spectrophotometer ("V-570" manufactured by JASCO Corporation). The measurement conditions were set as follows.

Response: Fast
Bandwidth: 2.0 nm
Measurement wavelength range: 200 nm to 2500 nm
Scan speed: 400 nm/min An absorptivity at a wavelength of 1064 nm and an absorptivity at a wavelength of 532 nm were calculated according to the formula: absorptivity=100−diffuse reflectance (%) from the obtained results.

$O_{1s}/Bi_{4f}$ was determined using a scanning X-ray photoelectron spectrometer ("Quantum 2000" manufactured by ULVAC-PHI, Inc.).

Further, the amount of oxygen deficiency x was obtained according to the following formula (1) from the obtained $O_{1s}/Bi_{4f}$. The obtained values are shown in Table 1.

$$x = 3 - O_{1s}/Bi_{4f} \times 2 \quad (1)$$

Evaluation of Color Developability of Powder Itself

With respect to each of the powders obtained in Synthesis Examples 1 to 11 and Comparative Synthesis Examples 1 to 6, evaluation of the color developability of the powder itself was performed according to the following method. The evaluation results are shown in Table 1.

After the powder was filled in a steel container (diameter: 35 mm, depth: 10 mm), the powder together with the container was pressed at 15 tf for 10 seconds by a pressing machine (TYPE M, manufactured by Maekawa Testing Machine Mfg. Co., Ltd.), whereby a molded body was produced.

The obtained molded body was irradiated with a YAG laser (SL475K, manufactured by NEC Corporation) to discolor the molded body. The laser irradiation conditions were as follows: input current: 11 A, feed speed: 1000 mm/sec, and Q-sw frequency: 7 kHz. The color of the discolored portion was measured by a colorimeter (COLORCOM C, manufactured by Dainichi Seika Co., Ltd.).

Color Developability of Powder Itself: The black printing performance when the powder itself was irradiated with a laser was evaluated according to the following criteria.

x: Printing could not be performed.
Δ: The print was blurred.
○: The print was good.
◉: The print was clear.

TABLE 1

| | Ratio of metallic aluminum (wt %) | Absorptivity α1 | Absorptivity α2 | $O_{1s}/Bi_{4f}$ | Amount of oxygen deficiency x | Color developability of powder itself |
|---|---|---|---|---|---|---|
| Synthesis Example 1 | 0.01 | 38.67 | 47.11 | 1.495 | 0.010 | ◉ |
| Synthesis Example 2 | 0.1 | 41.49 | 49.29 | 1.490 | 0.020 | ◉ |
| Synthesis Example 3 | 1 | 50.79 | 59.13 | 1.465 | 0.070 | ◉ |
| Synthesis Example 4 | 1 | 52.85 | 60.15 | 1.460 | 0.080 | ◉ |
| Synthesis Example 5 | 1 | 60.63 | 67.03 | 1.450 | 0.100 | ◉ |
| Synthesis Example 6 | 0.001 | 36.21 | 45.73 | 1.495 | 0.010 | ◉ |
| Synthesis Example 7 | 0.5 | 52.20 | 60.94 | 1.480 | 0.040 | ◉ |
| Synthesis Example 8 | 2.5 | 62.88 | 71.28 | 1.430 | 0.140 | ◉ |
| Synthesis Example 9 | 5 | 68.93 | 77.61 | 1.390 | 0.220 | ◉ |
| Synthesis Example 10 | 10 | 48.16 | 56.32 | 1.460 | 0.080 | ◉ |
| Synthesis Example 11 | 20 | 49.52 | 57.15 | 1.465 | 0.070 | ◉ |
| Comparative Synthesis Example 1 | 0.01 | 18.89 | 19.91 | 1.499 | 0.002 | X |
| Comparative Synthesis Example 2 | 0.01 | 39.21 | 47.92 | 1.497 | 0.006 | Δ |
| Comparative Synthesis Example 3 | 5 | 80.18 | 87.34 | 1.345 | 0.310 | ◉ |

TABLE 1-continued

|  | Ratio of metallic aluminum (wt %) | Absorptivity α1 | Absorptivity α2 | $O_{1s}/Bi_{4f}$ | Amount of oxygen deficiency x | Color developability of powder itself |
|---|---|---|---|---|---|---|
| Comparative Synthesis Example 4 | — | 18.41 | 19.53 | 1.500 | 0.000 | X |
| Comparative Synthesis Example 5 | — | 41.36 | 31.30 | — | — | X |
| Comparative Synthesis Example 6 | — | 89.29 | 60.57 | — | — | X |

From Table 1, it is found that, in comparison with the powders obtained in Comparative Synthesis Examples 1 to 4, each of the powders obtained in Synthesis Examples 1 to 11 is bismuth oxide with oxygen deficiency, in which the range of the amount of oxygen deficiency x is as follows: $0.01 \leq x \leq 0.3$, and has high absorptivities at wavelengths of 1064 nm and 532 nm in the ultraviolet-visible absorption spectra, and also has high color developability of the powder itself.

It is also found that in order to obtain bismuth oxide with oxygen deficiency, in which the range of the amount of oxygen deficiency x is as follows: $0.01 \leq x \leq 0.3$, it is necessary to mix commercially available bismuth oxide serving as the starting material and metallic aluminum at a ratio of the latter to the former of 0.001 to 20% by weight.

On the other hand, it is found that, in comparison with the powders obtained in Synthesis Examples 1 to 11, the powder of Comparative Synthesis Example 1 has low absorptivities at wavelengths of 1064 nm and 532 nm in the ultraviolet-visible absorption spectra, and has an amount of oxygen deficiency less than 0.01, and also has low color developability of the powder itself.

It is found that, in comparison with the powder obtained in Synthesis Example 1, the powder of Comparative Synthesis Example 2 has comparable absorptivities at wavelengths of 1064 nm and 532 nm in the ultraviolet-visible absorption spectra, but has an amount of oxygen deficiency less than 0.01, and also has low color developability of the powder itself.

Further, it is found that, in comparison with the powders obtained in Synthesis Examples 1 to 11, the powder of Comparative Synthesis Example 3 has a high absorptivity α1 at a wavelength of 1064 nm and a high absorptivity α2 at a wavelength of 532 nm in the ultraviolet-visible absorption spectra, and also has favorable color developability of the powder itself, but has an amount of oxygen deficiency x more than 0.3.

Still further, it is found that, in comparison with the powders obtained in Synthesis Examples 1 to 11, each of the powders of Comparative Synthesis Examples 5 and 6 shows high absorptivities at wavelengths of 1064 nm and 532 nm in the ultraviolet-visible absorption spectra but has very low color developability of the powder itself.

Production and Evaluation of Product Containing Additive Example 1

The oxygen-deficient bismuth oxide powder obtained in Synthesis Example 1 was added as the additive to a high-density polyethylene resin in an amount of 0.025 PHR (the number of parts by weight of the additive with respect to 100 parts by weight of the resin) and dispersed therein for 10 minutes by a paint shaker. After the resulting composition was dried at 70° C. for 3 hours, a plate-shaped molded material with a thickness of 3 mm was produced at a molding temperature of 200° C. by using an injection molding machine ("JSW, J505A11" manufactured by The Japan Steel Works, Ltd.).

Examples 2 to 11

Plate-shaped molded materials were produced in the same manner as in Example 1 except that each of the oxygen-deficient bismuth oxide powders obtained in Synthesis Examples 2 to 11 was used as the additive.

Comparative Examples 1 to 6

Plate-shaped molded materials were produced in the same manner as in Example 1 except that each of the powders of Comparative Synthesis Examples 1 to 6 was used as the additive.

Evaluation Test for Molded Material

With respect to the plate-shaped molded materials obtained in Examples 1 to 11 and Comparative Examples 1 to 6, the resin coloration property and laser marking property were evaluated according to the following methods. The obtained results are summarized in Table 2.

(1) Resin Coloration Property

The resin coloration property in the plate-shaped molded material was evaluated by visual observation according to the following criteria.

x: The resin was colored dark gray to black.
Δ: The resin was colored light gray.
○: The resin was hardly colored.

(2) Laser Marking Property

The plate-shaped molded plate was irradiated with a YAG laser ("SL475K" manufactured by NEC Corporation) to discolor the molded plate black, thereby performing printing. The laser irradiation conditions were as follows: input current: 20 A, feed speed: 500 mm/sec, and Q-sw frequency: 5 kHz.

The color of the discolored portion was measured by a spectrophotometer ("COLORCOM C" manufactured by Dainichi Seika Co., Ltd.), and the blackness calculated from the L* value at that time was evaluated according to the following criteria.

Printing blackness: the printing blackness when the molded material was irradiated with a laser (which was expressed as an index when the blackness of Example 1 was taken as 100)

x: Printing could not be substantially performed (less than 20 with respect to the blackness of Example 1 taken as 100).
Δ: The blackness was poor (20 or more and less than 80 with respect to the blackness of Example 1 taken as 100).
○: The blackness was good (80 or more and less than 90 with respect to the blackness of Example 1 taken as 100).
◎: The blackness was very good (90 or more with respect to the blackness of Example 1 taken as 100).

Printing Definition: the printing fineness when the molded material was irradiated with a laser (which was evaluated by visual observation)
x: Printing could not be substantially performed.
Δ: The print was blurred.
○: The print was good.
⊙: The print was fine.

TABLE 2

| | Resin coloration property | Laser marking printing property | | | |
|---|---|---|---|---|---|
| | | Printing blackness | | | |
| | | L * value | Blackness (%) | Evaluation of blackness | Printing definition |
| Example 1 | ○ | 30.1 | 100.0 | ⊙ | ⊙ |
| Example 2 | ○ | 29.2 | 103.1 | ⊙ | ⊙ |
| Example 3 | ○ | 27.9 | 107.9 | ⊙ | ⊙ |
| Example 4 | ○ | 28.0 | 107.5 | ⊙ | ⊙ |
| Example 5 | ○ | 27.1 | 111.1 | ⊙ | ⊙ |
| Example 6 | ○ | 33.0 | 91.2 | ⊙ | ⊙ |
| Example 7 | ○ | 28.6 | 105.2 | ⊙ | ⊙ |
| Example 8 | Δ | 26.5 | 113.6 | ⊙ | ⊙ |
| Example 9 | Δ | 26.0 | 115.8 | ⊙ | ⊙ |
| Example 10 | ○ | 27.3 | 110.3 | ⊙ | ⊙ |
| Example 11 | ○ | 27.7 | 108.7 | ⊙ | ⊙ |
| Comparative Example 1 | ○ | 45.9 | 65.6 | Δ | X |
| Comparative Example 2 | ○ | 40.3 | 74.7 | Δ | X |
| Comparative Example 3 | X | 26.2 | 114.9 | ⊙ | Δ |
| Comparative Example 4 | ○ | 46.6 | 64.6 | Δ | X |
| Comparative Example 5 | ○ | 39.2 | 76.8 | Δ | X |
| Comparative Example 6 | ○ | 38.4 | 78.4 | Δ | Δ |

From Table 2, it is found that the resin coloration property and laser marking property of each of the plate-shaped molded materials of Examples 1 to 11 produced using the oxygen-deficient bismuth oxides of Synthesis Examples 1 to 11 are all favorable.

The reason why the laser marking property of the plate-shaped molded material of Comparative Example 1 is poor is because the amount of oxygen deficiency x included in the powder obtained in Comparative Synthesis Example 1 is as low as less than 0.01 and the color developability of the powder itself is low as shown in Table 1.

Further, as found from Table 1, the absorptivity α1 at a wavelength of 1064 nm in the ultraviolet-visible absorption spectra of the powder obtained in Comparative Synthesis Example 2 is as high as that of the powder obtained in Synthesis Example 1, however, as found from Table 2, the laser marking property of the plate-shaped molded material of Comparative Example 2 produced using the powder is lower than that of the plate-shaped molded material of Example 1. This is considered to be because even if the absorptivity α1 of the additive for laser marking, that is, bismuth oxide is high, the color developability of the powder itself when it is irradiated with a laser is not improved unless oxygen deficiency is introduced into the structure.

The plate-shaped molded material of Comparative Example 3 showed favorable printing blackness and printing definition. However, this material has a poor resin coloration property. That is, the plate-shaped molded material was colored dark gray, and therefore, the visibility of the print is poor, and as a result, it is found that the molded material has a poor laser marking property.

Further, as found from Table 1, each of the powders obtained in Comparative Synthesis Examples 5 and 6 shown in Table 1 has a high absorptivity α1, however, the laser marking property of each of the plate-shaped molded materials of Comparative Examples 5 and 6 produced using these powders is lower in comparison with Examples 1 to 11. This result is apparently derived from the very low color developability of the powder itself in Comparative Synthesis Examples 5 and 6 as shown in Table 1.

As described above, it is found from Tables 1 and 2 that the reason why each of the plate-shaped molded materials of Examples 1 to 11 shows an excellent laser marking property is because the black color developability of the powder itself when it is irradiated with a laser of each of the oxygen-deficient bismuth oxides of Synthesis Examples 1 to 11 is significantly improved.

Example 12

To an acrylic resin, the oxygen-deficient bismuth oxide powder obtained in Synthesis Example 1 and titanium oxide were added at the following ratio, and glass beads were further added thereto, and the entire mixture was dispersed for 120 minutes by a paint shaker, whereby an acrylic coating material composition was obtained.

| | |
|---|---|
| Acrylic resin | 90 parts |
| Oxygen-deficient bismuth oxide powder (Synthesis Example 1) | 5 parts |
| Titanium oxide | 5 parts |

This coating material composition was applied onto an art paper with an applicator, whereby an acrylic coating layer with a thickness of 5 μm was formed.

Examples 13 to 16

Acrylic coating layers were formed in the same manner as in Example 12 except that an acrylic coating material composition was obtained by using each of the oxygen-deficient bismuth oxide powders obtained in Synthesis Examples 2 to 5 as the additive.

Example 17

To an acrylic resin, the oxygen-deficient bismuth oxide powder obtained in Synthesis Example 2 and titanium oxide were added at the following ratio, and glass beads were further added thereto, and the entire mixture was dispersed for 120 minutes by a paint shaker, whereby an acrylic coating material composition was obtained.

| | |
|---|---|
| Acrylic resin | 99 parts |
| Oxygen-deficient bismuth oxide powder (Synthesis Example 2) | 0.5 parts |
| Titanium oxide | 0.5 parts |

This coating material composition was spread on an art paper with an applicator and dried at room temperature. This procedure was repeated 5 times, whereby an acrylic coating layer with a thickness of 750 μm was formed.

Example 18

To an acrylic resin, the oxygen-deficient bismuth oxide powder obtained in Synthesis Example 2 and titanium oxide were added at the following ratio, and glass beads were further added thereto, and the entire mixture was dispersed for 120 minutes by a paint shaker, whereby an acrylic coating material composition was obtained.

| | |
|---|---|
| Acrylic resin | 98 parts |
| Oxygen-deficient bismuth oxide powder (Synthesis Example 2) | 1.0 parts |
| Titanium oxide | 1.0 parts |

This coating material composition was applied onto an art paper with an applicator and dried at room temperature. This procedure was repeated 3 times, whereby an acrylic coating layer with a thickness of 450 μm was formed.

Example 19

To an acrylic resin, the oxygen-deficient bismuth oxide powder obtained in Synthesis Example 2 and titanium oxide were added at the following ratio, and glass beads were further added thereto, and the entire mixture was dispersed for 120 minutes by a paint shaker, whereby an acrylic coating material composition was obtained.

| | |
|---|---|
| Acrylic resin | 80 parts |
| Oxygen-deficient bismuth oxide powder (Synthesis Example 2) | 10 parts |
| Titanium oxide | 10 parts |

This coating material composition was applied onto an art paper with an applicator and dried at room temperature, whereby an acrylic coating layer with a thickness of 5 μm was formed.

Example 20

To an acrylic resin, the oxygen-deficient bismuth oxide powder obtained in Synthesis Example 2 and titanium oxide were added at the following ratio, and glass beads were further added thereto, and the entire mixture was dispersed for 120 minutes by a paint shaker, whereby an acrylic coating material composition was obtained.

| | |
|---|---|
| Acrylic resin | 20 parts |
| Oxygen-deficient bismuth oxide powder (Synthesis Example 2) | 40 parts |
| Titanium oxide | 40 parts |

This coating material composition was applied onto an art paper with an applicator and dried at room temperature, whereby an acrylic coating layer with a thickness of 5 μm was formed.

Example 21

To an acrylic resin, the oxygen-deficient bismuth oxide powder obtained in Synthesis Example 2 and titanium oxide were added at the following ratio, and glass beads were further added thereto, and the entire mixture was dispersed for 120 minutes by a paint shaker, whereby an acrylic coating material composition was obtained.

| | |
|---|---|
| Acrylic resin | 10 parts |
| Oxygen-deficient bismuth oxide powder (Synthesis Example 2) | 90 parts |
| Titanium oxide | 10 parts |

This coating material composition was applied onto an art paper with an applicator and dried at room temperature, whereby an acrylic coating layer with a thickness of 5 μm was formed.

Examples 22 to 24

An acrylic coating layer was formed in the same manner as in Example 12 on each of the base materials shown in Table 3 using the acrylic coating material composition prepared in Example 13.

Comparative Example 7

An acrylic coating layer was formed in the same manner as in Example 12 except that the oxygen-deficient bismuth oxide powder (the amount of oxygen deficiency x: less than 0.01) of Comparative Synthesis Example 2 was used as the additive.

Comparative Example 8

An acrylic coating layer was formed in the same manner as in Example 12 except that the bismuth oxide powder of Comparative Synthesis Example 4 was used as the additive.

Evaluation Test for Acrylic Coating Layer

With respect to the acrylic coating layers obtained in Examples 12 to 24 and Comparative Examples 7 and 8, the resin coloration property and laser marking property were evaluated according to the methods shown below. The obtained evaluation results are summarized in Table 3 together with the parts by weight of the bismuth compound used, the parts by weight of the coloring pigment, and the type of the base material.

(1) Resin Coloration Property

The degree of coloration (white was used as the standard reference) of the acrylic resin when the acrylic coating layer was formed was evaluated by visual observation according to the following criteria.

X: very deeply colored white
Δ: Deeply colored white
◯: Lightly colored white
⊚: Substantially white (2) Laser Marking Property The acrylic coating layer was irradiated with a YAG laser ("SL475K" manufactured by NEC Corporation) to discolor the acrylic coating layer. The laser irradiation conditions were as follows: input current: 10 A, feed speed: 1000 mm/sec, and Q-sw frequency: 5 kHz. The evaluation criteria are as follows.

x: Printing could not be substantially performed.
Δ: The blackness was poor.
◯: The blackness was good.

TABLE 3

| | Ink composition | | | | | Laser | |
|---|---|---|---|---|---|---|---|
| | Oxygen-deficient bismuth oxide | | Coloring pigment | | | Resin coloration | marking |
| | type | parts by weight | type | parts by weight | Base material | property | property |
| Example 12 | Synthesis Example 1 | 5 | Titanium oxide | 5 | Art paper | ◯ | ◯ |
| Example 13 | Synthesis Example 2 | 5 | Titanium oxide | 5 | Art paper | ◯ | ◯ |
| Example 14 | Synthesis Example 3 | 5 | Titanium oxide | 5 | Art paper | ◯ | ◯ |
| Example 15 | Synthesis Example 4 | 5 | Titanium oxide | 5 | Art paper | ◯ | ◯ |
| Example 16 | Synthesis Example 5 | 5 | Titanium oxide | 5 | Art paper | ◯ | ◯ |
| Example 17 | Synthesis Example 2 | 0.5 | Titanium oxide | 0.5 | Art paper | ◯ | ◯ |
| Example 18 | Synthesis Example 2 | 1 | Titanium oxide | 1 | Art paper | ◯ | ◯ |
| Example 19 | Synthesis Example 2 | 10 | Titanium oxide | 10 | Art paper | ◯ | ◯ |
| Example 20 | Synthesis Example 2 | 40 | Titanium oxide | 40 | Art paper | ◯ | ◯ |
| Example 21 | Synthesis Example 2 | 90 | Titanium oxide | 10 | Art paper | Δ | ◯ |
| Example 22 | Synthesis Example 2 | 5 | Titanium oxide | 5 | PET film | ◯ | ◯ |
| Example 23 | Synthesis Example 2 | 5 | Titanium oxide | 5 | Aluminum foil | ◯ | ◯ |
| Example 24 | Synthesis Example 2 | 5 | Titanium oxide | 5 | Glass | ◯ | ◯ |
| Comparative Example 7 | Comparative Synthesis Example 2 | 5 | Titanium oxide | 5 | Art paper | ◯ | Δ |
| Comparative Example 8 | Comparative Synthesis Example 4 | 5 | Titanium oxide | 5 | Art paper | ◯ | X |

From Table 3, it is found that the resin coloration property and laser marking property of each of the acrylic coating layers obtained in Examples 12 to 24 are all favorable.

Example 25

The oxygen-deficient bismuth oxide obtained in Synthesis Example 1 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 20.5 parts |
| Methyl ethyl ketone | 16.5 parts |
| Urethane-based varnish | 33.0 parts |
| Oxygen-deficient bismuth oxide (Synthesis Example 1) | 20.0 parts |
| Titanium oxide | 10.0 parts |

The obtained urethane-based ink was spread on an art paper with an applicator and dried at 50° C., whereby an ink film layer with a thickness of 4 μm was formed.

Examples 26 to 29

Ink film layers with a thickness of 4 μm were formed in the same manner as in Example 25 by using each of the oxygen-deficient bismuth oxides obtained in Synthesis Examples 2 to 5 as the additive.

Example 30

The oxygen-deficient bismuth oxide obtained in Synthesis Example 3 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 36.5 parts |
| Methyl ethyl ketone | 20.9 parts |
| Urethane-based varnish | 41.8 parts |

-continued

| | |
|---|---|
| Oxygen-deficient bismuth oxide (Synthesis Example 3) | 0.5 parts |
| Titanium oxide | 0.3 parts |

The obtained urethane-based ink was spread on an art paper with an applicator and dried at 50° C. This procedure was repeated 4 times, whereby an ink film layer with a thickness of 750 μm was obtained.

Example 31

The oxygen-deficient bismuth oxide obtained in Synthesis Example 3 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 34.3 parts |
| Methyl ethyl ketone | 21.4 parts |
| Urethane-based varnish | 42.8 parts |
| Oxygen-deficient bismuth oxide (Synthesis Example 3) | 1.0 parts |
| Titanium oxide | 0.5 parts |

The obtained urethane-based ink was spread on an art paper with an applicator and dried at 50° C. This procedure was repeated 3 times, whereby an ink film layer with a thickness of 550 μm was obtained.

Example 32

The oxygen-deficient bismuth oxide obtained in Synthesis Example 3 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 29.4 parts |
| Methyl ethyl ketone | 18.5 parts |
| Urethane-based varnish | 37.1 parts |
| Oxygen-deficient bismuth oxide (Synthesis Example 3) | 10.0 parts |
| Titanium oxide | 5.0 parts |

The obtained urethane-based ink was spread on an art paper with an applicator and dried at 50° C., whereby an ink film layer with a thickness of 150 µm was obtained.

Example 33

The oxygen-deficient bismuth oxide obtained in Synthesis Example 3 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 7.9 parts |
| Methyl ethyl ketone | 7.4 parts |
| Urethane-based varnish | 24.7 parts |
| Oxygen-deficient bismuth oxide (Synthesis Example 3) | 40.0 parts |
| Titanium oxide | 20.0 parts |

Thereafter, an ink film layer with a thickness of 4 µm was formed in the same manner as in Example 25.

Example 34

The oxygen-deficient bismuth oxide obtained in Synthesis Example 2 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 7.5 parts |
| Methyl ethyl ketone | 4.1 parts |
| Urethane-based varnish | 16.4 parts |
| Oxygen-deficient bismuth oxide (Synthesis Example 2) | 59.8 parts |
| Titanium oxide | 12.0 parts |

Thereafter, an ink film layer with a thickness of 4 µm was formed in the same manner as in Example 25.

Example 35

The oxygen-deficient bismuth oxide obtained in Synthesis Example 2 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 2.2 parts |
| Methyl ethyl ketone | 1.6 parts |
| Urethane-based varnish | 8.2 parts |
| Oxygen-deficient bismuth oxide (Synthesis Example 2) | 80.0 parts |
| Titanium oxide | 8.0 parts |

Thereafter, an ink film layer with a thickness of 4 µm was formed in the same manner as in Example 25.

Example 36

The oxygen-deficient bismuth oxide obtained in Synthesis Example 3 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 21.4 parts |
| Methyl ethyl ketone | 18.2 parts |
| Acrylic varnish | 33.4 parts |
| Oxygen-deficient bismuth oxide (Synthesis Example 3) | 18.0 parts |
| Titanium oxide | 9.0 parts |

Thereafter, an ink film layer with a thickness of 4 µm was formed in the same manner as in Example 25.

Examples 37 to 39

An ink film layer was formed in the same manner as in Example 25 on each of the base materials shown in Table 4 using the ink prepared in Example 27.

Evaluation Test for Ink Film Layer

Each of the ink film layers obtained in Examples 25 to 39 was irradiated with a YAG laser to discolor the ink film layer. The laser irradiation conditions were as follows: input current: 10 A, laser output: 10%, feed speed: 1000 mm/sec, and Q-sw frequency: 5 kHz.

The color of the discolored portion was measured by a spectrophotometer (COLORCOM C, manufactured by Dainichi Seika Co., Ltd.), and the laser marking property was evaluated according to the following criteria. The evaluation results are shown in Table 4.

x: Printing could not be performed.
Δ: The print was blurred.
○: The print was good.
⊚: The print was clear.

Example 40

A planographic ink varnish ("SOV322" manufactured by Showa Varnish Co., Ltd.) was applied to the upper surface of the ink film layer formed in Example 27 with a bar coater (R. D. S Laboratory Coating Rod, ROD No. 3) and dried at 100° C., whereby a protective layer was formed on the upper surface of the ink film layer. In this manner, a multi-layered body composed of the ink film layer and the protective layer was produced, and the laser marking property of the multi-layered body was evaluated according to the same evaluation criteria as in Example 25. The laser irradiation conditions were as follows: input current: 11 A, feed speed: 1000 mm/sec, and Q-sw frequency: 7 kHz. The evaluation results are shown in Table 4.

Examples 41 to 43

A planographic ink varnish was applied to the upper surface of each of the ink film layers formed in Examples 37 to 39 by a bar coater and dried at 100° C., whereby a protective layer was formed on the upper surface of the ink film layer. In this manner, a multi-layered body composed of the ink film layer and the protective layer was produced, and the laser marking property of the multi-layered body was evaluated according to the same evaluation criteria as in Example 25. The laser irradiation conditions were as follows: input current: 11 A, feed speed: 1000 mm/sec, and Q-sw frequency: 7 kHz. The evaluation results are shown in Table 4.

Comparative Example 9

The formation of an ink film layer and the evaluation of the laser marking property were performed in the same manner as in Example 25 except that the oxygen-deficient bismuth oxide (the amount of oxygen deficiency x: less than 0.01) of Comparative Synthesis Example 2 was used as the additive. The evaluation results are shown in Table 4.

Comparative Example 10

The formation of an ink film layer and the evaluation of the laser marking property were performed in the same manner as in Example 25 except that the bismuth oxide of Comparative Synthesis Example 4 was used as the additive. The evaluation results are shown in Table 4.

In Table 4, the parts by weight of the bismuth oxide, the parts by weight of the coloring pigment, and the type of the base material used in Examples 25 to 43 and Comparative Examples 9 and 10, with or without the protective layer, the resin coloration property, and the like are shown.

With respect to the resin coloration property, the degree of coloration (white was used as the standard reference) of the resin when the ink film layer was formed is expressed according to the following criteria.

x: Very deeply colored white
Δ: Deeply colored white
○: Lightly colored white
⊙: Substantially white

TABLE 4

| | Ink composition | | | | | | | | |
|---|---|---|---|---|---|---|---|---|---|
| | Oxygen-deficient bismuth oxide | | Coloring pigment | | | | | Resin | Laser |
| | type | parts by weight | type | parts by weight | Resin used | Base material | With or without protective layer | coloration property | marking property |
| Example 25 | Synthesis Example 1 | 20 | Titanium oxide | 10 | Urethane varnish | Art paper | — | ⊙ | ○ |
| Example 26 | Synthesis Example 2 | 20 | Titanium oxide | 10 | Urethane varnish | Art paper | — | ⊙ | ○ |
| Example 27 | Synthesis Example 3 | 20 | Titanium oxide | 10 | Urethane varnish | Art paper | — | ⊙ | ⊙ |
| Example 28 | Synthesis Example 4 | 20 | Titanium oxide | 10 | Urethane varnish | Art paper | — | ⊙ | ⊙ |
| Example 29 | Synthesis Example 5 | 20 | Titanium oxide | 10 | Urethane varnish | Art paper | — | ⊙ | ⊙ |
| Example 30 | Synthesis Example 3 | 0.5 | Titanium oxide | 0.3 | Urethane varnish | Art paper | — | ⊙ | ○ |
| Example 31 | Synthesis Example 3 | 1 | Titanium oxide | 0.5 | Urethane varnish | Art paper | — | ⊙ | ○ |
| Example 32 | Synthesis Example 3 | 10 | Titanium oxide | 5 | Urethane varnish | Art paper | — | ⊙ | ⊙ |
| Example 33 | Synthesis Example 3 | 40 | Titanium oxide | 20 | Urethane varnish | Art paper | — | ⊙ | ⊙ |
| Example 34 | Synthesis Example 2 | 60 | Titanium oxide | 12 | Urethane varnish | Art paper | — | ○ | ⊙ |
| Example 35 | Synthesis Example 2 | 80 | Titanium oxide | 8 | Urethane varnish | Art paper | — | ○ | ⊙ |
| Example 36 | Synthesis Example 3 | 20 | Titanium oxide | 10 | Acrylic varnish | Art paper | — | ⊙ | ⊙ |
| Example 37 | Synthesis Example 3 | 20 | Titanium oxide | 10 | Urethane varnish | PET film | — | ⊙ | ⊙ |
| Example 38 | Synthesis Example 3 | 20 | Titanium oxide | 10 | Urethane varnish | Aluminum foil | — | ⊙ | ⊙ |
| Example 39 | Synthesis Example 3 | 20 | Titanium oxide | 10 | Urethane varnish | Glass | — | ⊙ | ⊙ |
| Example 40 | Synthesis Example 3 | 20 | Titanium oxide | 10 | Urethane varnish | Art paper | Planographic printing varnish | ⊙ | ○ |
| Example 41 | Synthesis Example 3 | 20 | Titanium oxide | 10 | Urethane varnish | PET film | Planographic printing varnish | ⊙ | ○ |
| Example 42 | Synthesis Example 3 | 20 | Titanium oxide | 10 | Urethane varnish | Aluminum foil | Planographic printing varnish | ⊙ | ○ |
| Example 43 | Synthesis Example 3 | 20 | Titanium oxide | 10 | Urethane varnish | Glass | Planographic printing varnish | ⊙ | ○ |
| Comparative Example 9 | Comparative Synthesis Example 2 | 20 | Titanium oxide | 10 | Urethane varnish | Art paper | — | ⊙ | Δ |
| Comparative Example 10 | Comparative Synthesis Example 4 | 20 | Titanium oxide | 10 | Urethane varnish | Art paper | — | ⊙ | X |

From Table 4, it is found that the ink film layers obtained in Examples 25 to 39 and the multi-layered bodies obtained in Examples 40 to 43 have an excellent laser marking property with a YAG laser and also exhibits a favorable laser marking property even if the base material is any of an art paper, a PET film, an aluminum foil, and a glass.

Example 44

The oxygen-deficient bismuth oxide obtained in Synthesis Example 3 was used as the additive, and the following components were mixed. Then, glass beads were added thereto, and the respective components were dispersed over 120 minutes by a paint conditioner, whereby a urethane-based ink was prepared.

| | |
|---|---|
| Toluene | 18.0 parts |
| Ethyl acetate | 20.0 parts |
| Urethane-based varnish | 30.0 parts |
| Oxygen-deficient bismuth oxide (Synthesis Example 3) | 20.0 parts |
| Titanium oxide | 10.0 parts |
| Ultraviolet absorber (TINUVIN 111 FDL) | 2.0 parts |

By using the obtained printing ink, gravure printing was performed on one surface of an oriented polypropylene film (OPP film) subjected to a corona treatment on both surfaces so that the thickness after drying was 3 μm by a simple gravure printing machine provided with a gravure plate with a plate depth of 35 μm, and the ink was dried at 50° C., whereby a gravure printed film was obtained.

The laser marking property of the obtained printed film was evaluated. The laser irradiation conditions were as follows: input current: 10 A, feed speed: 1000 mm/sec, and Q-sw frequency: 7 kHz. The evaluation results are shown in Table 5.

The evaluation criteria are as follows.
x: Printing could not be performed.
Δ: The print was blurred.
○: The print was good.
◉: The print was clear.

Example 45

On the printed surface of the gravure printed film formed in Example 44, a two-part polyurethane-based adhesive was applied to a thickness of 3 μm, and on the surface having the adhesive applied thereto, a polyethylene film with a thickness of 60 μm was laminated by a commercially available laminator, whereby a laminate film was produced.

With respect to this film, the laser marking property was evaluated according to the same evaluation criteria as in Example 44. The laser irradiation conditions were as follows: input current: 16 A, feed speed: 1000 mm/sec, and Q-sw frequency: 7 kHz. The evaluation results are shown in Table 5.

Example 46

The oxygen-deficient bismuth oxide obtained in Synthesis Example 3 was used as the additive, and the following blending components were allowed to pass through three rolls three times, whereby a rosin-modified phenolic resin-based printing ink was prepared.

| | |
|---|---|
| Rosin-modified phenolic varnish | 46.0 parts |
| Pigment dispersant (DISPERBYK-180) | 1.0 parts |
| Oxygen-deficient bismuth oxide (Synthesis Example 3) | 20.0 parts |
| Titanium oxide | 30.0 parts |
| Cobalt naphthenate | 0.50 parts |
| Manganese naphthenate | 0.50 parts |
| Ultraviolet absorber (TINUVIN 111 FDL) | 2.0 parts |

30 cc of the obtained printing ink was placed on a blanket portion of a simple offset printing machine (RI tester) provided with a plate cylinder, a blanket, and an impression cylinder, and offset printing was performed on an art paper so that the thickness after drying was 5 μm, and the ink was dried at 100° C. for 5 minutes, whereby an offset printed material was obtained.

The laser marking property of this offset printed material was evaluated according to the same evaluation criteria as in Example 44. The laser irradiation conditions were as follows: input current: 10 A, feed speed: 1000 mm/sec, and Q-sw frequency: 7 kHz. The evaluation results are shown in Table 5.

Example 47

On the offset printed material produced in Example 46, an aqueous varnish was applied to a thickness of 3 μm by a roll coater, and the laser marking property was evaluated according to the same evaluation criteria as in Example 44.

The laser irradiation conditions were as follows: input current: 15 A, feed speed: 1000 mm/sec, and Q-sw frequency: 7 kHz. The evaluation results are shown in Table 5.

In Table 5, the parts by weight of the bismuth oxide, the parts by weight of the coloring pigment, and the type of the base material used in Examples 44 to 47, with or without the protective layer, and the resin coloration property are shown.

Resin coloration property: the degree of coloration (white was used as the standard reference) of the resin when the ink film layer was formed
x: Very deeply colored white
Δ: Deeply colored white
○: Lightly colored white
◉: Substantially white

TABLE 5

| | Ink composition | | | | | | | |
|---|---|---|---|---|---|---|---|---|
| | Oxygen-deficient bismuth oxide | | Coloring pigment | | | | Resin | Laser |
| | type | parts by weight | type | parts by weight | Resin used | Base material | With or without protective layer | coloration property | marking property |
| Example 44 | Synthesis Example 3 | 20 | Titanium oxide | 10 | Urethane varnish | OPP film | Without | ◉ | ◉ |
| Example 45 | Synthesis Example 3 | 20 | Titanium oxide | 10 | Urethane varnish | OPP film | Laminate | ◉ | ◉ |
| Example 46 | Synthesis Example 3 | 20 | Titanium oxide | 30 | Rosin-modified phenolic varnish | Art paper | Without | ◉ | ◉ |
| Example 47 | Synthesis Example 3 | 20 | Titanium oxide | 30 | Rosin-modified phenolic varnish | Art paper | Aqueous varnish | ◉ | ◉ |

From the results shown in Table 5, it is found that the gravure printed films and the offset printed materials obtained in Examples 44 to 47 all have favorable resin coloration property and laser marking property.

As described above, from the results of Examples 1 to 47, it is found that the molded materials, the coating layers, the ink films, the printed materials and the multi-layered bodies containing oxygen-deficient bismuth oxide all have favorable resin coloration property and laser marking property.

That is, it is found that the oxygen-deficient bismuth oxide according to the present invention is capable of imparting a laser marking property with blackness without causing undesirable coloration of a resin composition regardless of the type or shape of a resin to be used.

The invention claimed is:

1. An additive for laser marking, comprising oxygen-deficient bismuth oxide represented by the general formula: $Bi_2O_{(3-x)}$ (provided that x is 0.01 or more and 0.3 or less), wherein in the general formula, x represents the amount of oxygen deficiency calculated according to the following formula (1) from the ratio ($O_{1s}/Bi_{4f}$) of the peak area attributed to the 1s electrons of oxygen bonded to bismuth to the peak area attributed to the 4f electrons of bismuth obtained by X-ray photoelectron spectrometry:

$$x=3-O_{1s}/Bi_{4f}\times 2 \qquad (1).$$

2. The additive for laser marking according to claim 1, wherein x is 0.01 or more and 0.1 or less.

3. The additive for laser marking according to claim 1, wherein an absorptivity α1 at a wavelength of 1064 nm calculated according to the following formula (2) from a diffuse reflectance in the ultraviolet-visible-near-infrared reflectance spectra is from 20 to 80%:

$$\text{absorptivity}=100-\text{diffuse reflectance (\%)} \qquad (2).$$

4. The additive for laser marking according to claim 1, wherein an absorptivity α2 at a wavelength of 532 nm calculated according to the following formula (2) from a diffuse reflectance in the ultraviolet-visible-near-infrared reflectance spectra is from 20 to 80%:

$$\text{absorptivity}=100-\text{diffuse reflectance (\%)} \qquad (2).$$

5. The additive for laser marking according to claim 1, wherein the additive is obtained by a method including a step of mixing bismuth oxide or a bismuth compound which is converted to an oxide by application of heat and metallic aluminum at a ratio of the latter to the former of 0.001 to 20% by weight by a dry process or a wet process, and a step of heating the resulting mixture at 60 to 400° C. under reduced pressure lower than the atmospheric pressure by 0.05 MPa or more.

6. The additive for laser marking according to claim 5, wherein the ratio of metallic aluminum to bismuth oxide or a bismuth compound which is converted to an oxide by application of heat is from 0.1 to 5% by weight.

7. A molded material for laser marking, comprising the additive for laser marking according to claim 1 in an amount of 0.01 to 30% by weight.

8. A coating material for laser marking, comprising the additive for laser marking according to claim 1 in an amount of 0.1 to 90% by weight.

9. A coating layer for laser marking, wherein the coating layer is obtained by coating at least one surface of a base material with the additive for laser marking according to claim 1.

10. An ink for laser marking, comprising the additive for laser marking according to claim 1 in an amount of 0.1 to 90% by weight.

11. The ink for laser marking according to claim 10, wherein the ink is obtained by covering a substrate selected from a mica flake, a mica flake covered with a metal oxide, an $SiO_2$ flake, and a glass filler with the additive for laser marking according to any one of claims 1 to 6 or by mixing the additive with the substrate.

12. The ink for laser marking according to claim 10, wherein the ink contains at least one material selected from the group consisting of an inorganic or organic pigment, a dye, a resin, an organic solvent, a reactive monomeric compound, and a stabilizer.

13. The ink for laser marking according to claim 10, wherein the resin is a urethane-based resin or an acrylic resin.

14. An ink film layer for laser marking, wherein the ink film layer is obtained by coating at least one surface of a base material with the ink for laser marking according to claim 10.

15. The ink film layer for laser marking according to claim 14, wherein the base material is composed of a plastic film, a paper, a metal foil, or a glass.

16. A printed material for laser marking, wherein the printed material is obtained by performing printing on at least one surface of a base material with the ink for laser marking according to claim 10.

17. The printed material for laser marking according to claim 16, wherein the base material is composed of a plastic film, a paper, a metal foil, or a glass.

18. A multi-layered body for laser marking, comprising an ink film layer composed of the ink for laser marking according to claim 10 provided on a base material, and a transparent surface protective layer provided on the ink film layer.

19. The multi-layered body for laser marking according to claim 18, wherein the base material is composed of a plastic film, a paper, a metal foil, or a glass.

20. A laser marking product, wherein the laser marking product is obtained by performing marking by irradiating the molded material for laser marking according to claim 7, the coating layer for laser marking according to claim 9, the ink film layer for laser marking according to claim 14, the printed material for laser marking according to claim 16, or the multi-layered body for laser marking according to claim 18 with a laser.

21. The laser marking product according to claim 20, wherein the laser is a YAG laser with a center wavelength of 1064 nm or a green laser with a center wavelength of 532 nm.

* * * * *